United States Patent
Yang et al.

(10) Patent No.: US 11,592,694 B2
(45) Date of Patent: Feb. 28, 2023

(54) WAVEGUIDE LIQUID CRYSTAL DISPLAY

(71) Applicants: Kent State University, Kent, OH (US); BOE Technology Group Co., Ltd., Beijing (CN)

(72) Inventors: Deng-Ke Yang, Hudson, OH (US); Xiaochen Zhou, Kent, OH (US); Guangkui Qin, Kent, OH (US)

(73) Assignees: KENT STATE UNIVERSITY, Kent, OH (US); BOE TECHNOLOGY GROUP CO., LTD., Beijing (CN)

( * ) Notice: Subject to any disclaimer, the term of this patent is extended or adjusted under 35 U.S.C. 154(b) by 297 days.

(21) Appl. No.: 16/332,102

(22) PCT Filed: Sep. 11, 2017

(86) PCT No.: PCT/US2017/050881
§ 371 (c)(1),
(2) Date: Mar. 11, 2019

(87) PCT Pub. No.: WO2018/049292
PCT Pub. Date: Mar. 15, 2018

(65) Prior Publication Data
US 2019/0361272 A1 Nov. 28, 2019

Related U.S. Application Data

(60) Provisional application No. 62/385,279, filed on Sep. 9, 2016.

(51) Int. Cl.
*G02F 1/13* (2006.01)
*G02F 1/1334* (2006.01)
*G02F 1/1337* (2006.01)

(52) U.S. Cl.
CPC .......... *G02F 1/1326* (2013.01); *G02F 1/1334* (2013.01); *G02F 1/13347* (2021.01); *G02F 1/133723* (2013.01)

(58) Field of Classification Search
CPC . G02F 1/1326; G02F 1/1334; G02F 1/133723
See application file for complete search history.

(56) References Cited

U.S. PATENT DOCUMENTS

| 5,099,343 A | 3/1992 | Margerum et al. |
| 5,305,126 A | 4/1994 | Kobayashi et al. |
| (Continued) | | |

FOREIGN PATENT DOCUMENTS

WO   2017/161912 A1   9/2017

OTHER PUBLICATIONS

Pucker et al., "Silicon-based near-infrared tunable filters filled with positive or negative dielectric anisotropic liquid crystals", Journal of Applied Physics, vol. 95, No. 2, Jan. 15, 2004, p. 767-769.

(Continued)

*Primary Examiner* — Thanh Nhan P Nguyen
(74) *Attorney, Agent, or Firm* — Fay Sharpe LLP

(57) ABSTRACT

A liquid crystal display is configured such that a composite layer thereof is transparent to incident light in one voltage condition (e.g., in the absence of an applied voltage) and scatters incident light out of the display in another voltage condition (e.g., when a voltage is applied). The liquid crystal display does not need polarizers or color filters.

19 Claims, 11 Drawing Sheets

(56) References Cited

U.S. PATENT DOCUMENTS

| | | |
|---|---|---|
| 6,608,657 B2 | 8/2003 | Hiyama et al. |
| 6,618,104 B1 | 9/2003 | Date et al. |
| 2009/0135342 A1* | 5/2009 | Lee .................. G02F 1/134363 |
| | | 349/96 |
| 2016/0231497 A1* | 8/2016 | Kato .................... G02B 6/0035 |
| 2017/0199431 A1* | 7/2017 | Kim ..................... G02F 1/1339 |

OTHER PUBLICATIONS

Cheng et al., "Waveguide displays based on polymer-dispersed liquid crystals", SPIE Newsroom, Aug. 12, 2011, [available online at http://doi.org/10.1117/2.1201108.003805; accessed Oct. 27, 2017], 2 pages.

* cited by examiner

WAVEGUIDE LIQUID CRYSTAL DISPLAY

CROSS-REFERENCE TO RELATED APPLICATIONS

This application is a National Stage Entry of International Application No. PCT/US2017/050881, filed Sep. 11, 2017, and entitled "Waveguide Liquid Crystal Display"; which claims priority to U.S. Provisional Application Ser. No. 62/385,279, filed Sep. 9, 2016, and entitled "Waveguide Liquid Crystal Display", the contents of which are incorporated by reference herein.

BACKGROUND

The present disclosure relates to liquid crystal displays. In particular, the displays are configured such that a composite layer thereof is transparent when no voltage is applied and scatters incident light when a voltage is applied.

State-of-the art liquid crystal displays for flat panel display applications (e.g., televisions, computer monitors, and smart phones) typically include a light source and a liquid crystal layer. Light is emitted by the light source and the liquid crystal modulates the light intensity. The displays need two polarizers in order for the liquid crystal to operate properly. The liquid crystal layer is sandwiched between the polarizers. Voltages are applied to the liquid crystal to vary its optical retardation, and thus change the emitted light intensity. The displays also need color filters to display colored images. The polarizers and color filters absorb light, and therefore the displays usually have poor light efficiencies (e.g., less than 10%).

It would be desirable to develop new liquid crystal displays that do not require polarizers or color filters.

BRIEF DESCRIPTION

The present disclosure relates to liquid crystal displays which do not require polarizers or color filters.

Disclosed in embodiments is a liquid crystal display comprising in sequence: a first transparent electrode; a first alignment layer; a composite layer comprising a liquid crystal and a polymer; a second alignment layer; and a second transparent electrode; and further comprising at least one light source; wherein when no voltage is applied the composite layer is transparent and the display acts as a waveguide plane through which incident light propagates; wherein when a voltage is applied the composite layer scatters incident light out of the display; and wherein the liquid crystal display does not comprise at least one of polarizers and color filters. In some embodiments, the liquid crystal display includes one or more color filters but no polarizers. In other embodiments, the liquid crystal display includes one or more polarizers but no color filters. In further embodiments, the liquid crystal display is devoid of both polarizers and color filters.

In some embodiments, the display further includes an absorbing film on a side of the second transparent electrode opposite the second alignment layer.

The first transparent electrode and the second transparent electrode may comprise indium tin oxide.

In some embodiments, the liquid crystal has a positive dielectric anisotropy. In other embodiments, the liquid crystal has a negative dielectric anisotropy.

The liquid crystal may be tilted toward a cell normal direction when the voltage is applied or tilted parallel to the first transparent electrode and the second transparent electrode when the voltage is applied.

In some embodiments, the at least one light source comprises a light-emitting diode.

The at least one light source may include a red light-emitting diode, a green light-emitting diode, and a blue light-emitting diode.

The at least one light source may comprise or consist of a white light-emitting diode.

In some embodiments, the first alignment layer and the second alignment layer comprise a polyimide.

Disclosed in other embodiments is a liquid crystal display comprising in sequence: a first transparent substrate; a plurality of interdigitated electrodes; a composite layer comprising a liquid crystal and a polymer; and a second transparent substrate; and further comprising at least one light source; wherein when no voltage is applied the composite layer is transparent and the display acts as a waveguide plane through which incident light propagates; wherein when a voltage is applied the composite layer scatters incident light out of the display; and wherein the liquid crystal display does not comprise at least one of polarizers and color filters. In some embodiments, the liquid crystal display includes one or more color filters but no polarizers. In other embodiments, the liquid crystal display includes one or more polarizers but no color filters. In further embodiments, the liquid crystal display is devoid of both polarizers and color filters.

The interdigitated electrodes may comprise indium tin oxide.

In some embodiments, the liquid crystal has a positive dielectric anisotropy. In other embodiments, the liquid crystal has a negative dielectric anisotropy.

The liquid crystal may be tilted toward a cell normal direction when the voltage is applied or tilted parallel to the first transparent substrate and the second transparent substrate when the voltage is applied.

In some embodiments, the at least one light source comprises a light-emitting diode.

The at least one light source may comprise a red light-emitting diode, a green light-emitting diode, and a blue light-emitting diode.

In some embodiments, the display further includes an alignment layer between the interdigitated electrodes and the composite layer.

Disclosed in further embodiments is a method for operating and/or controlling a liquid crystal display. The method includes applying a voltage to change a state of the liquid crystal display from a first state to a second state. In some embodiments, the first state is a light-propagating state and the second state is a light-scattering state. In other embodiments, the first state is a light-scattering state and the second state is a light propagating state.

Disclosed in other embodiments is a method for operating and/or controlling a liquid crystal display. The method includes removing an applied voltage to change a state of the liquid crystal display from a first state to a second state. In some embodiments, the first state is a light-propagating state and the second state is a light-scattering state. In other embodiments, the first state is a light-scattering state and the second state is a light propagating state.

The liquid crystal display used in either or both of these methods may include (optionally in sequence): a first transparent substrate; a plurality of interdigitated electrodes; a composite layer comprising a liquid crystal and a polymer; and a second transparent substrate. In other embodiments, the liquid crystal display includes (optionally in sequence) a first transparent electrode, a first alignment layer, a composite layer, a second alignment layer, and a second transparent electrode. The display further includes at least one light source.

In some embodiments, the display is devoid of at least one of polarizers and color filters.

In some particular embodiments, the display is devoid of polarizers but may contain one or more color filters.

In other particular embodiments, the display is devoid of color filters but may contain one or more polarizers.

In further particular embodiments, the display is devoid of both polarizers and color filters.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 6a illustrates the red-color sub-frame. FIG. 6b illustrates the green color sub-frame. FIG. 6c illustrates the blue color sub-frame. The overall color of the left side pixel is magenta (red plus blue). The overall color of the right side pixel is yellow (red plus green).

FIG. 11a shows the display when no voltage is applied. FIG. 11b shows the waveguide wherein a 30 V voltage was applied during the red, green, and blue sub-frames. FIG. 11c shows the display wherein the voltage was only applied during the red sub-frame. FIG. 11d shows the display wherein the voltage was only applied during the green sub-frame. FIG. 11e shows the display wherein the voltage was only applied during the blue sub-frame. FIG. 11f shows the display wherein the voltage was applied during the red and blue sub-frames.

FIG. 12a illustrates the transparent state. FIG. 12b illustrates the scattering state.

DETAILED DESCRIPTION

Figure 1:
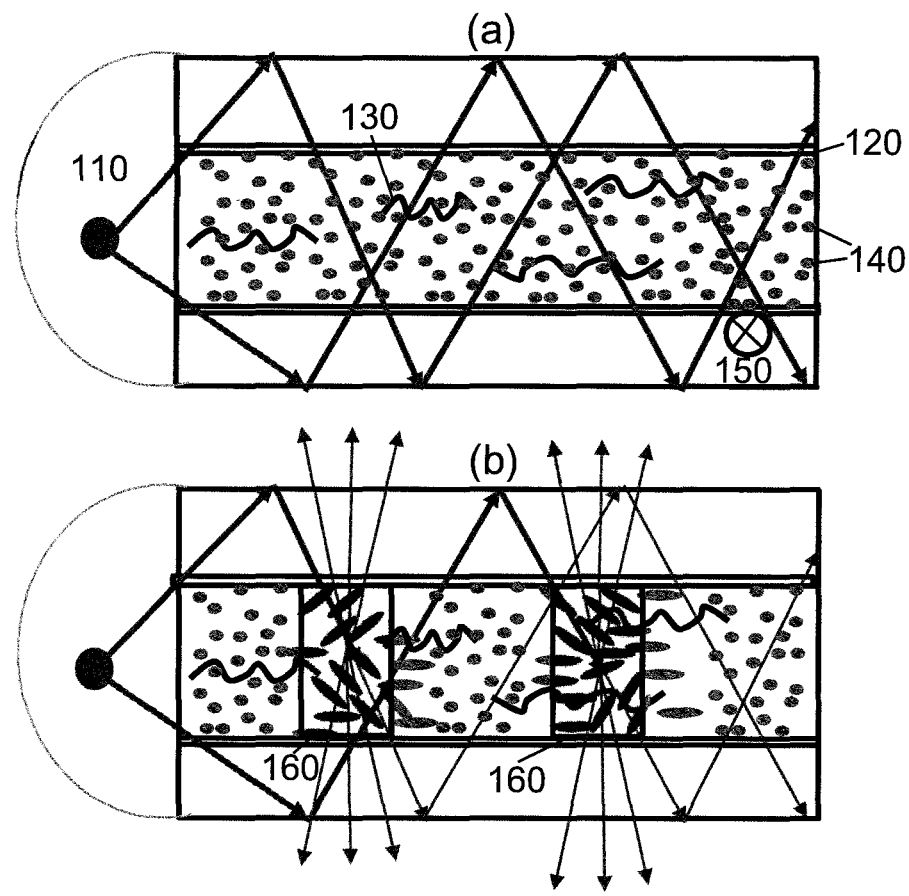
FIG. 1 includes schematic diagrams of a waveguide display in (FIG. 1a) a transparent state and (FIG. 1b) a scattering state.

A more complete understanding of the devices and methods disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. In the following specification and the claims which follow, reference will be made to a number of terms, which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing devices or methods as "consisting of" and "consisting essentially of" the enumerated components/steps, which allows the presence of only the named components/steps, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable.

The term "about" can be used to include any numerical value that can vary without changing the basic function of that value. When used with a range, "about" also discloses the range defined by the absolute values of the two endpoints. The term "about" may refer to plus or minus 10% of the indicated number.

The waveguide displays of the present disclosure do not require polarizers, exhibit ultrafast response time, and allow a color sequential scheme to display colored images. Therefore, the displays have ultrahigh light efficiency.

The displays include two parallel substrates with at least one transparent electrode and a composite layer containing a liquid crystal and a polymer. The liquid crystal/polymer composite layer is sandwiched between the two substrates. A light source, such as a light-emitting diode (LED), is installed on the edge of the display. The (unpolarized) light produced by the edge light source is provided into the display. When no voltage is applied, the liquid crystal/polymer composite is transparent and the display acts as a waveguide plate through which the incident light propagates. No light comes out of the display. When a voltage is applied across the composite layer, the material becomes scattering and the incident light is scattered out of the display. This display does not need polarizers and has ultrahigh energy efficiency. It also has ultrafast response time. When three colored light (e.g., red, green and blue) sources are installed on the edge, it can be operated as a color sequential display. With a black absorbing film placed beneath it, the display can be used as a regular flat panel display. Without the absorbing film, it can be used as a transparent display. When no voltage is applied, the display is transparent to ambient light and the scene behind the display can be seen.

The structure of a display in accordance with some embodiments of the present disclosure is schematically shown in FIG. 1, wherein 110 denotes an edgelight, 120 denotes transparent electrodes, 130 denotes polymer networks, 140 denotes liquid crystals, 150 denotes the rubbing direction, and 160 denotes voltage applied pixels. The display includes two substrates, a layer of liquid crystal/polymer composite, and an edge light source. The substrates have a transparent electrode (e.g., and indium-tin-oxide or ITO electrode) on a surface thereof. On top of the ITO, an alignment layer is coated and/or rubbed for homogeneous alignment of the liquid crystal/polymer composite. The liquid crystal/polymer layer is sandwiched between the two substrates. An edge light, such as a LED, is installed on the edge of the display perpendicular (or parallel) to the alignment rubbing direction. The edge light produces light which is provided into the substrates and liquid crystal/polymer layer. When the incident light hits the substrate-air interface with a large incident angle (defined with respect to the normal of the substrate), it will be total internally reflected back because the refractive index of the substrate is larger than that of air. When no voltage is applied, the liquid crystal/polymer composite is transparent. The incident light is waveguided through the display and no light comes out as shown in FIG. 1a. When a voltage is applied to the composite in some pixel (region), the material is switched into a poly-domain structure and becomes light scattering, due to the aligning effects of the electric field and the polymer network. The incident light is scattered away from its original propagation direction. It hits the substrate-air interface with a small incident angle and comes out of the display as shown in FIG. 1b. This display does not need polarizers, and therefore its light efficiency is at least two times higher than regular polarizer-based liquid crystal displays.

Figure 2:
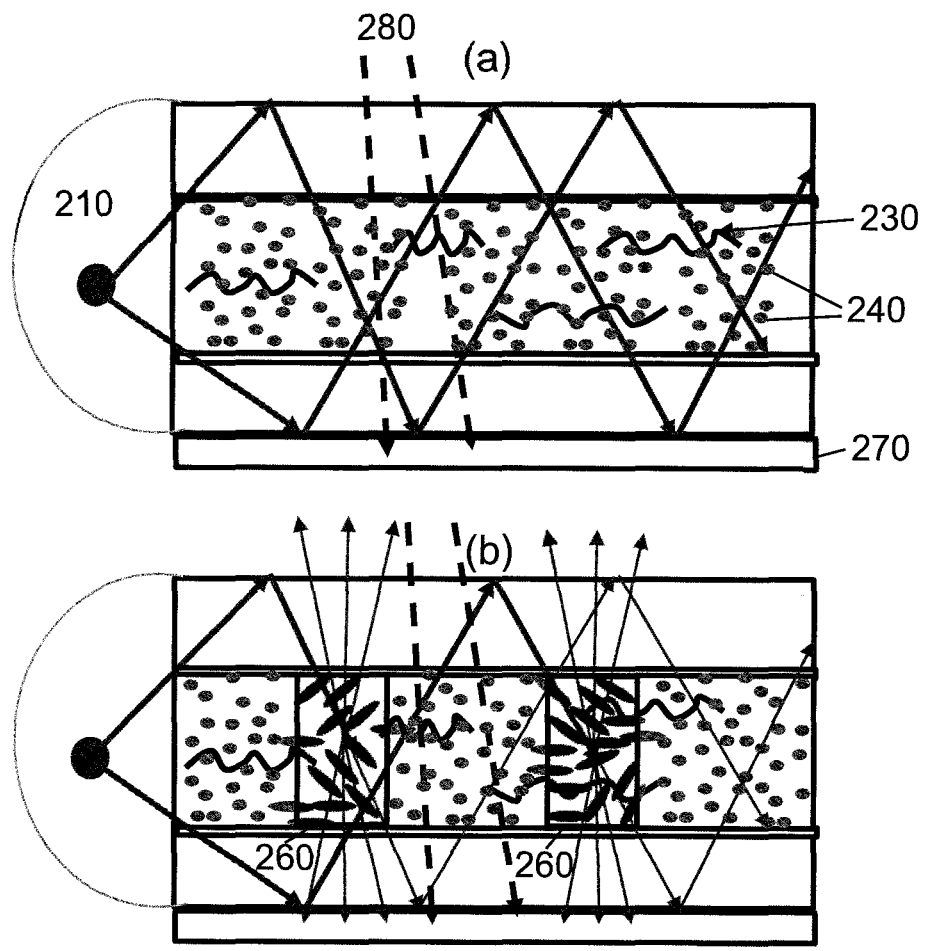
FIG. 2 includes schematic diagrams of a direct view waveguide display in (FIG. 2a) a dark state and (FIG. 2b) a bright state.

The waveguide displays of the present disclosure can be used as direct view displays. A non-limiting example of a design is schematically shown in FIG. 2, wherein 210 denotes an edgelight, 230 denotes polymer networks, 240 denotes liquid crystals, 260 denotes voltage applied pixels, 270 denotes an absorbing film, and 280 denotes ambient light. An absorbing film is placed beneath the bottom substrate, which absorbs ambient light. When no voltage is applied, the liquid crystal/polymer composite is transparent, and no light comes out as shown in FIG. 2a. The display appears dark. When a voltage is applied across a pixel, the material in the pixel becomes scattering, and light comes out as shown in FIG. 2b. The pixel appears bright.

Figure 3:
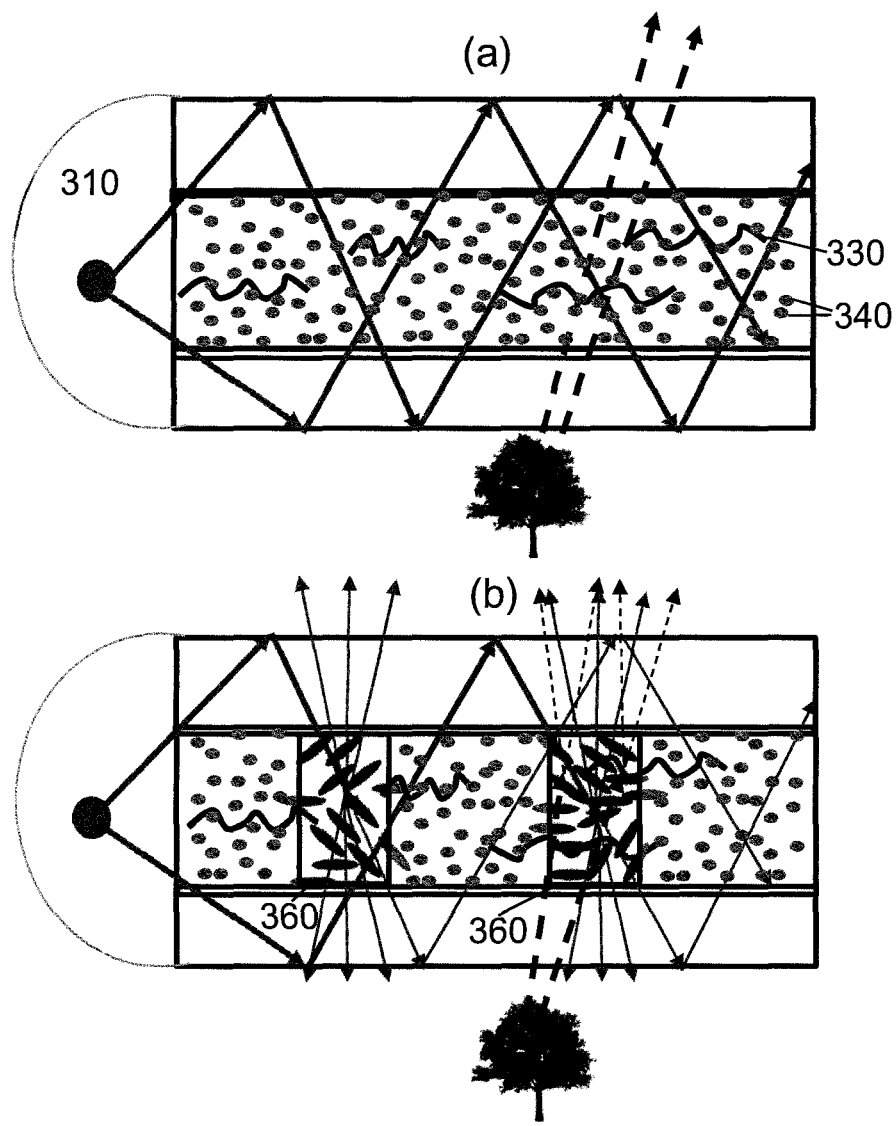
FIG. 3 includes schematic diagrams of a transparent waveguide display in (FIG. 3a) a transparent state and (FIG. 3b) a opaque state.

The waveguide displays of the present disclosure can also be used as transparent displays. A non-limiting example of a design is schematically shown in FIG. 3, wherein 310 denotes an edgelight, 330 denotes polymer networks, 340 denotes liquid crystals, and 360 denotes voltage applied pixels. When no voltage is applied, the liquid crystal/polymer composite is transparent, and the scene behind the display can be seen as shown in FIG. 3a. When a voltage is applied across a pixel, the material in the pixel becomes scattering, and the scene behind the display is blocked as shown in FIG. 3b.

Figure 4:
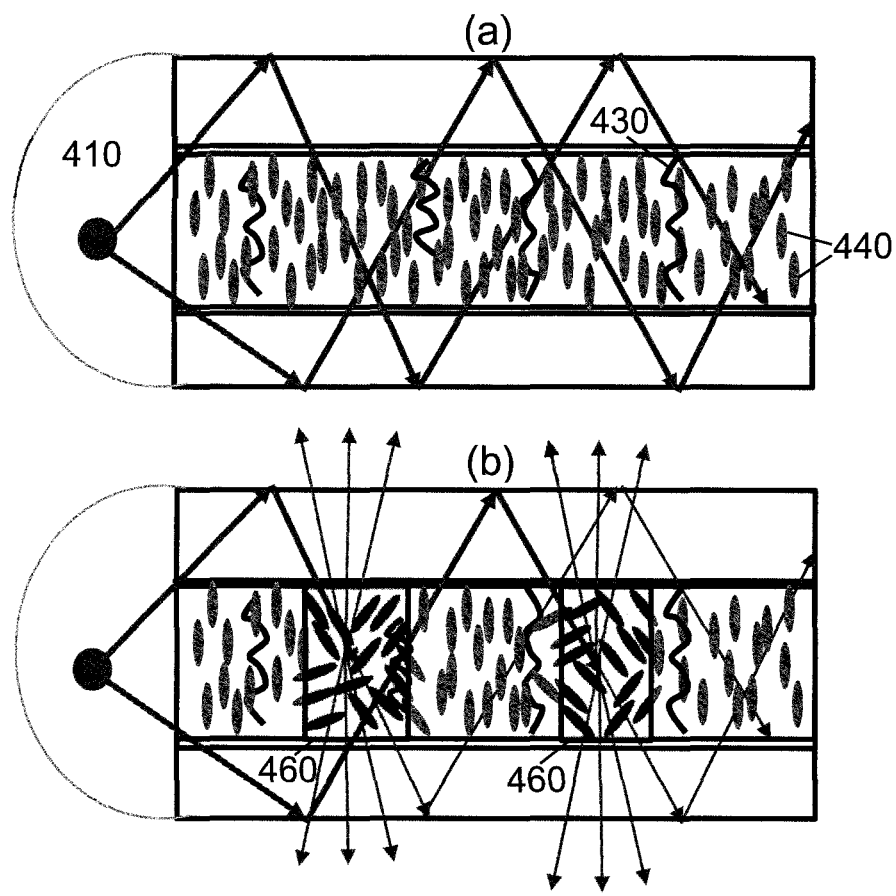
FIG. 4 includes schematic diagrams of a vertical aligned waveguide display in (FIG. 4a) a transparent state and (FIG. 4b) a scattering state.

In the waveguide displays discussed in some of the preceding paragraphs, the liquid crystal and polymer network are generally initially aligned parallel to the display substrate. The liquid crystal has a positive dielectric anisotropy. When no voltage is applied, the material is transparent. When a voltage is applied in the vertical direction, the liquid crystal is tilted toward the cell normal direction and becomes scattering. Another geometry of alignment, the vertical alignment, can also be used for the waveguide display, as shown in FIG. 4, wherein 410 denotes an edgelight, 430 denotes polymer networks, 440 denotes liquid crystals, and 460 denotes voltage applied pixels. Initially, the liquid crystal and polymer network are aligned perpendicular to the display substrate. The liquid crystal has a negative dielectric anisotropy. When no voltage is applied, the material is transparent (FIG. 4a). When a voltage is applied in the vertical direction, the liquid crystal is tilted toward parallel to the display substrate and becomes scattering (FIG. 4b).

Figure 5:
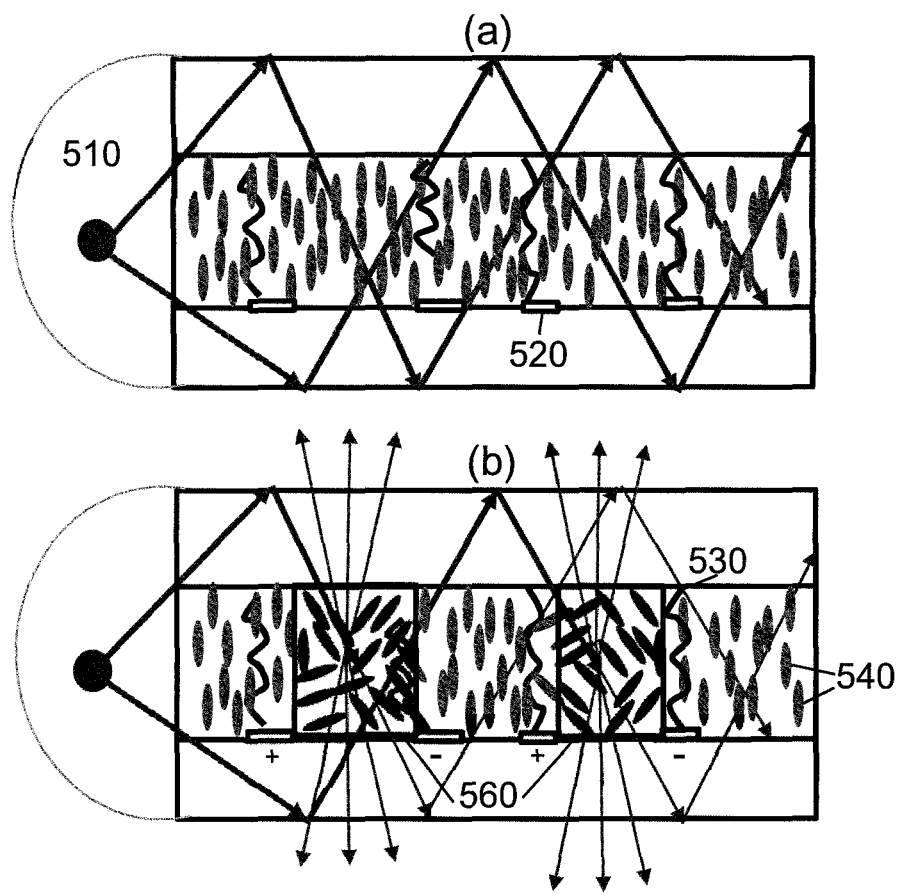
FIG. 5 includes schematic diagrams of an in-plane switching waveguide display in (FIG. 5a) a transparent state and (FIG. 5b) a scattering state.

In the waveguide displays discussed in some of the preceding paragraphs, the transparent electrodes are on the inner surface of the top and bottom substrates. When a voltage is applied, the generated electric field is perpendicular to the substrates. Another geometry of electrode, the in-place switching (IPS)/fringe-field switching (FFS) electrode, can also be used for the waveguide display, as shown in FIG. 5, wherein 510 denotes an edgelight, 520 denotes electrodes, 530 denotes polymer networks, 540 denotes liquid crystals, and 560 denotes voltage applied pixels. The interdigitated electrodes are only on the inner surface of one substrate. When a voltage is applied, the generated electric field is approximately parallel to the substrates. Initially the liquid crystal and polymer network are aligned perpendicular to the display substrate. The liquid crystal has a positive dielectric anisotropy. When no voltage is applied, the material is transparent (FIG. 5a). When a voltage is applied, the liquid crystal is tilted toward parallel to the display substrate and becomes scattering (FIG. 5b).

Figure 6:
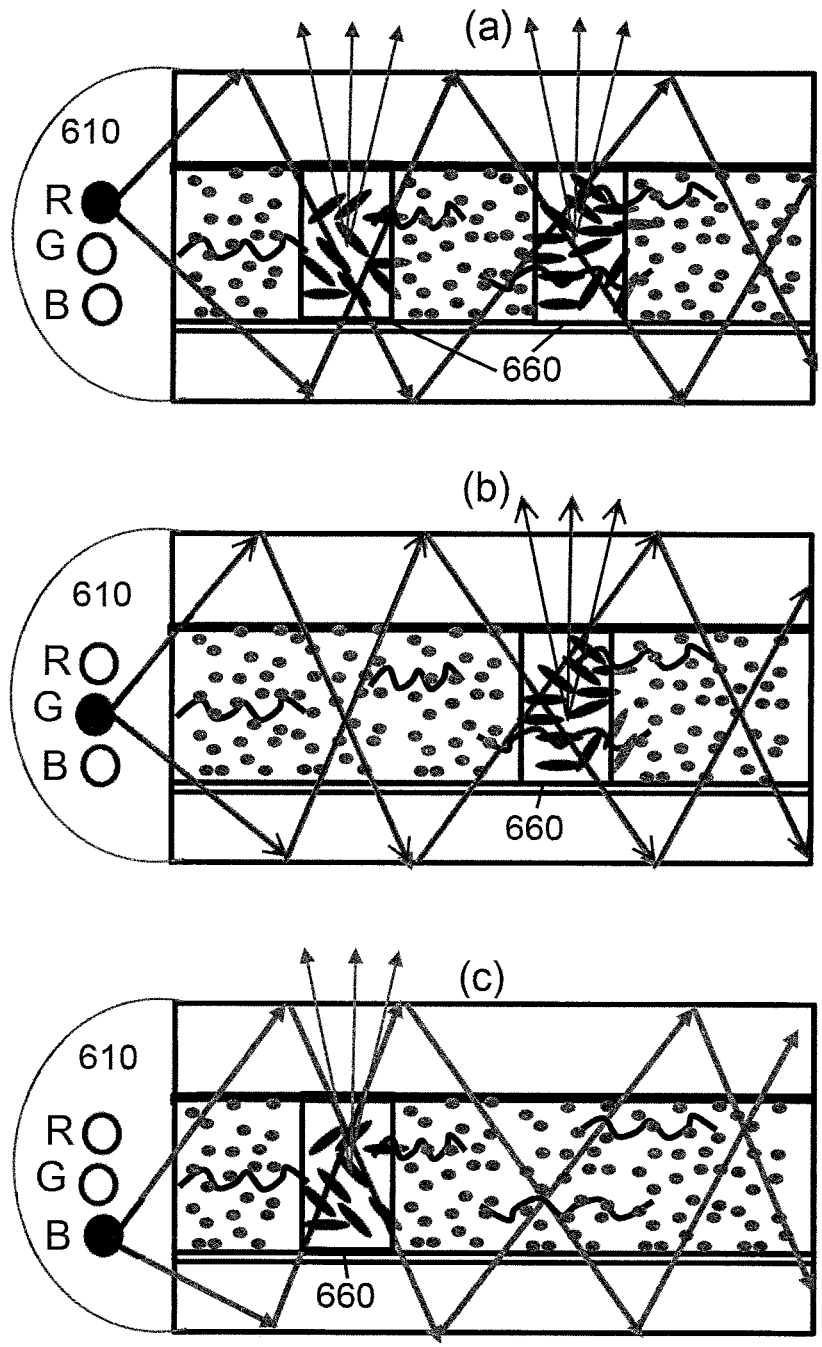
FIG. 6 includes schematic diagrams of a color sequential waveguide display.

The waveguide display has very fast response time. Both turn-on and turn-off times can be less than 1 ms. Therefore, it can be operated in a color sequential mode (also called field sequential color mode) to display full color images. A non-limiting example of a design is schematically shown in FIG. 6, wherein 610 denotes an edgelight and 660 denotes voltage applied pixels. Three LEDs with the primary color red (R), green (G), and blue (B), respectively, are installed on the edge of the display. The addressing frame is divided into three sub-frames: R, G, and B. During the R sub-frame, a voltage is applied to the red LED to turn it on. During the G sub-frame, a voltage is applied to the green LED to turn it on. During the B sub-frame, a voltage is applied to the blue LED to turn it on. The voltage applied to the liquid crystal/polymer composite is synchronized with the voltages applied to the LEDs. A red color image is displayed when the voltage is only applied to liquid crystal/polymer material during the R sub-frame. A green color image is displayed when the voltage is only applied to liquid crystal/polymer material during the G sub-frame. A blue color image is displayed when the voltage is only applied to liquid crystal/polymer material during the B sub-frame. A yellow color image is displayed when the voltage is applied to liquid crystal/polymer material during the R and G sub-frames. A magenta color image is displayed when the voltage is applied to liquid crystal/polymer material during the R and B sub-frames. A cyan color image is displayed when the voltage is applied to liquid crystal/polymer material during the G and B sub-frames. A white color image is displayed when the voltage is applied to liquid crystal/polymer material during the R, G, and B sub-frames. Regular liquid crystal displays need color filters, which absorb more than two-thirds of the incident light, in order to show colored images. This waveguide display can show colored images without color filters. Therefore, it can further greatly increase light efficiency.

Non-limiting examples of liquid crystals include the E-series and BL-series liquid crystals (commercially available from Merck).

In some embodiments, the E-series liquid crystal includes one or more of E7, E44, and E48.

In some embodiments, the BL-series liquid crystal includes one or more of BL003, BL006, and BL038.

In some embodiments, the liquid crystal component includes a cyano-biphenyl material.

In some embodiments, the liquid crystal component includes a cyano-terphenyl material.

In some embodiments, the liquid crystal component includes a mixtures of at least one cyano-biphenyl material and at least one cyano-terphenyl material.

In some embodiments, the liquid crystal component includes only one type of liquid crystal material.

In other embodiments, the liquid crystal component includes a plurality of distinct liquid crystal materials.

The plurality may include two, three, four, five, six, seven, eight, nine, ten, or more liquid crystal materials.

In more particular embodiments, the liquid crystal component includes at least two different liquid crystal materials. The ratio (by weight) of the first liquid crystal material to the second liquid crystal material may be in the range of about 1:99 to about 99:1, including from about 10:90 to about 90:10, about 20:80 to about 80:20, about 70:30 to about 30:70, about 40:60 to about 60:40, about 45:55 to about 55:45, and about 50:50.

The electrodes may be made from any film that is electrically conducting and optically transparent. Non-limiting examples include indium tin oxide electrodes and conducting polymer electrodes.

In some embodiments, the alignment layer(s) include a polyimide, poly(vinyl alcohol), and/or poly(methyl methacrylate).

Non-limiting examples of photoinitiators which may be used in the systems and methods of the present disclosure include benzoin methyl ether and the Irgacure series of photoinitiators (e.g., Irgacure 184 and Irgacure 651).

In some embodiments, the photoinitiator includes one or more of azobisisobutyronitrile (AIBN), a benzoyl peroxide, and camphorquinone.

The polymer networks may be formed from one or more reactive monomers/reactive mesogens. Non-limiting examples of reactive monomers/reactive mesogens include Merck's RM series and HCCH's HCM series. In some embodiments, the reactive monomer(s) is/are selected from RM257, RM82, HCM-024, and HCM-028.

In some embodiments, the polymer networks are formed via reactions involving one or more of 2-Methylbenzene-1, 4-diyl bis{4-[3-(acryloyloxy)propoxy]benzoate} (CAS No. 174063-87-7), 1,4-Bis-[4-(6-acryloyloxyhexyloxy)benzoyloxy]-2-methylbenzene (CAS No. 125248-71-7), 2-methyl-1,4-phenylene bis(4-(3-(acryloyloxy)propoxy)benzoate) (CAS No. 174063-87-7), 2-methyl-1,4-phenylene bis(4-((6-(acryloyloxy)hexyl)oxy)benzoate) (CAS No. 125248-71-7), 4-methoxyphenyl 4-((6-(acryloyloxy)hexyl)oxy)benzoate (CAS No. 82200-53-1), 4-cyanophenyl 4-((6-(acryloyloxy)hexyl)oxy)benzoate (CAS No. 83847-14-7), 6-(4-hydroxyphenoxy)hexyl acrylate, 4-(3-(acryloyloxy)propoxy)benzoic acid (CAS No. 245349-46-6), 4-((6-(acryloyl oxy)hexyl)oxy)benzoic acid (CAS No. 83883-26-5), 6-((4'-cyano-[1,1'-biphenyl]-4-yl)oxy)hexyl acrylate, 4-((11-(acryloyl oxy)undecyl)oxy)benzoic acid, and 4-((6-(acryloyl oxy)hexyl)oxy)phenyl 4-methoxy benzoate.

Methods for operating and/or controlling a liquid crystal display are also disclosed. The methods may include either (a) applying a new voltage or (b) removing an applied voltage to change a state of the liquid crystal display from a first state to a second state.

In some embodiments, the first state is a light-propagating state and the second state is a light-scattering state. In other embodiments, the first state is a light-scattering state and the second state is a light propagating state. The liquid crystal display used in these methods may include (optionally in sequence): a first transparent substrate; a plurality of inter-digitated electrodes; a composite layer comprising a liquid crystal and a polymer; and a second transparent substrate. The display further includes at least one light source. In some embodiments, the display does not contain polarizers. In other embodiments, the display does not contain color filters. In further embodiments, the display does not contain polarizers or color filters.

In some embodiments, the voltage is in the range of from about 1 to about 100 V, including from about 2 to about 80 V, from about 5 to about 70 V, from about 10 to about 50 V, from about 20 to about 40 V, from about 25 to about 35 V, and about 30 V.

In some embodiments, the pulse width of the applied voltage is in the range of from about 1 to about 1000 ms, from about 50 to about 700 ms, from about 75 to about 400 ms, from about 100 to about 300 ms, from about 150 to about 250 ms, and about 200 ms.

The displays of the present disclosure find use in many industries and applications. Non-limiting examples include mobile devices, televisions, and transparent displays for advertisements.

The following examples are provided to illustrate the devices and methods of the present disclosure. The examples are merely illustrative and are not intended to limit the disclosure to the materials, conditions, or process parameters set forth therein.

EXAMPLES

Example 1

A mixture containing liquid crystal BL038 (from Merck) (low molecular weight nematic liquid crystal mixture), reactive monomer RM257 (from Merck) (also known as 4-(3-Acryloyloxypropyloxy)benzoic acid 2-methyl-1,4-phenylene ester and 2-Methyl-1,4-phenylene-bis[4[3 (acryloyloxy)propyloxy]benzoate]), and a small amount of photo-initiator BME (benzoin methyl ether) was prepared. The concentration of RM257 was 5 wt %. The material was filled into a 5 micron thick cell. The cell was assembled with two glass substrates with indium-tin-oxide (ITO) transparent electrodes. Before the assembly, the inner surfaces of the substrates were coated with PI2555 (from DuPont) (polyimide) and rubbed for homogeneous alignment of the liquid crystal. The cell was irradiated by UV light to polymerize the monomer. The curing conditions were that the curing time was 30 mins and UV intensity was 8 mW/cm$^2$.

Figure 7:
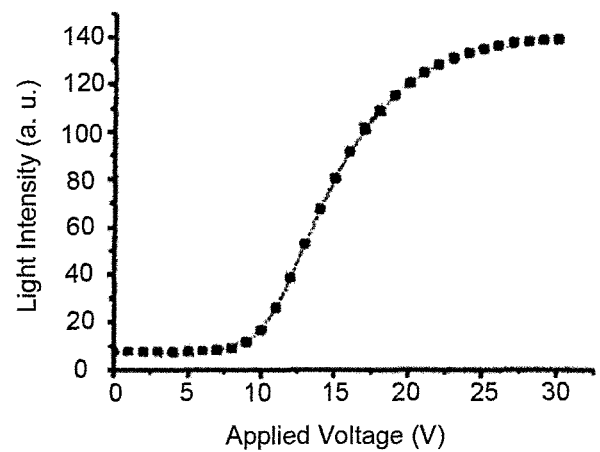
FIG. 7 is a graph displaying emitted light intensity versus applied voltage for Example 1.
Figure 8:
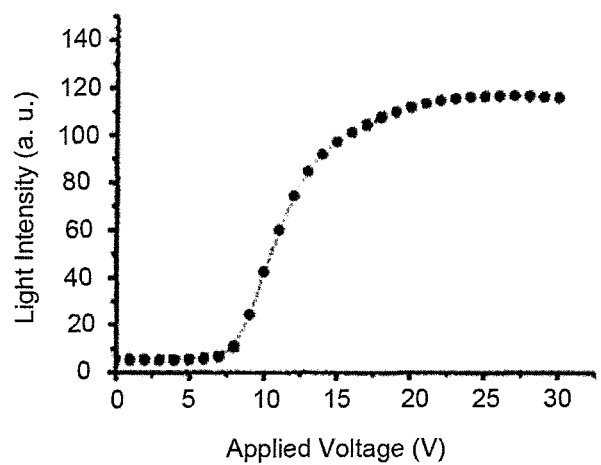
FIG. 8 is a graph displaying emitted light intensity versus applied voltage for Example 2.

A LED edge light was attached to the edge of the cell and a photo detector was placed on top of the cell in order to measure the out coming light intensity vs. voltage curve. The results are shown in FIG. 7. When there was no voltage applied across the cell, the intensity of light coming out of the cell was very low because no light was scattered. When voltages were applied across the cell, the light intensity increased.

Example 2

A mixture containing liquid crystal BL038 (from Merck), reactive monomer HCM-009 (from HCCH) (bifunctional monomer), and a small amount of photo-initiator BME was prepared. The concentration of HCM-009 was 5 wt %. The material was filled into a 5 micron thick cell. The cell was assembled with two glass substrates with indium-tin-oxide (ITO) transparent electrodes. Before the assembly, the inner surfaces of the substrates were coated with PI2555 (from DuPont) and rubbed for homogeneous alignment of the liquid crystal. The cell was irradiated by UV light to polymerize the monomer. The curing conditions were that the curing time was 30 mins and UV intensity was 8 mW/cm$^2$.

A LED edge light was attached to the edge of the cell and a photo detector was placed on top of the cell in order to measure the out coming light intensity vs. voltage curve. The results are shown in FIG. 7. When there was no voltage applied across the cell, the intensity of light coming out of the cell was very low because no light was scattered. When voltages were applied across the cell, the light intensity increased.

Example 3

A mixture containing liquid crystal BL038 (from Merck), reactive monomer RM257 (from Merck), and a small amount of photo-initiator BME was prepared. The concentration of RM257 was 7 wt %. The material was filled into a 5 micron thick cell. The cell was assembled with two glass substrates with indium-tin-oxide (ITO) transparent electrode. Before the assembly, the inner surfaces of the substrates were coated with PI2555 (from DuPont) and rubbed for homogeneous alignment of the liquid crystal. The cell was irradiated by UV light to polymerize the monomer. The curing conditions were that the curing time was 30 mins and UV intensity was 8 mW/cm$^2$.

Figure 9:
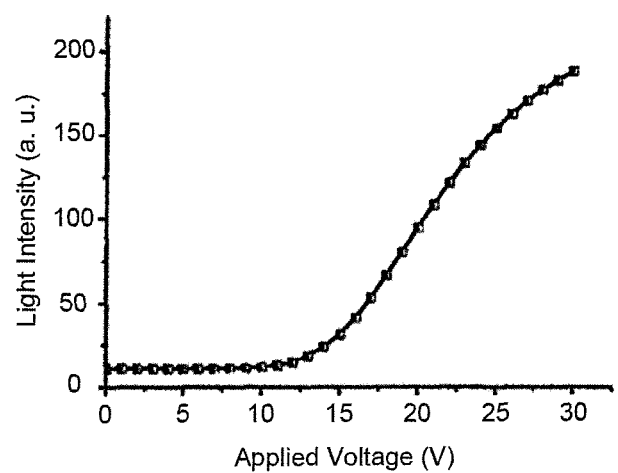
FIG. 9 is a graph displaying emitted light intensity versus applied voltage for Example 3.

A LED edge light was attached to the edge of the cell and a photo detector was placed on top of the cell in order to measure the out coming light intensity vs. voltage curve. The results are shown in FIG. 9. When there was no voltage applied across the cell, the intensity of light coming out of the cell was very low because no light was scattered. When voltages were applied across the cell, the light intensity increased.

Figure 10:
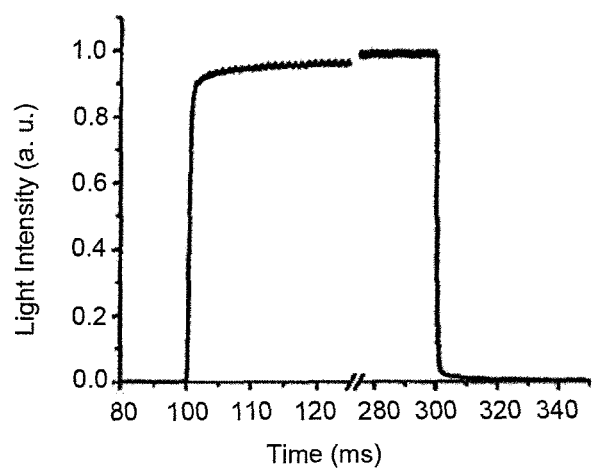
FIG. 10 is a graph displaying emitted light intensity versus time for Example 3.

When a 200 ms wide voltage pulse with the amplitude of 30 V was applied, the out coming light intensity vs. time curve of the waveguide display is shown in FIG. 10. The display had very fast response time. The turn-on time was 1.0 ms and the turn-off time was 0.7 ms. This display is suitable for color sequential display.

Example 4

A mixture containing liquid crystal BL038 (from Merck), reactive monomer RM257 (from HCCH), and a small amount of photo-initiator BME was prepared. The concentration of RM257 was 7 wt %. The material was filled into a 5 micron thick cell. The cell was assembled with two glass substrates with indium-tin-oxide (ITO) transparent electrodes. Before the assembly, the inner surfaces of the substrates were coated with PI2555 (from DuPont) and rubbed for homogeneous alignment of the liquid crystal. The cell was irradiated by UV light to polymerize the monomer. The curing conditions were that the curing time was 30 mins and UV intensity was 8 mW/cm$^2$.

Three LEDs with the colors of red, green and blue, respectively, were installed on the edge of the display. The display was operated in color sequential mode that the LEDs were turned on one at a time for 2 ms.

Figure 11:
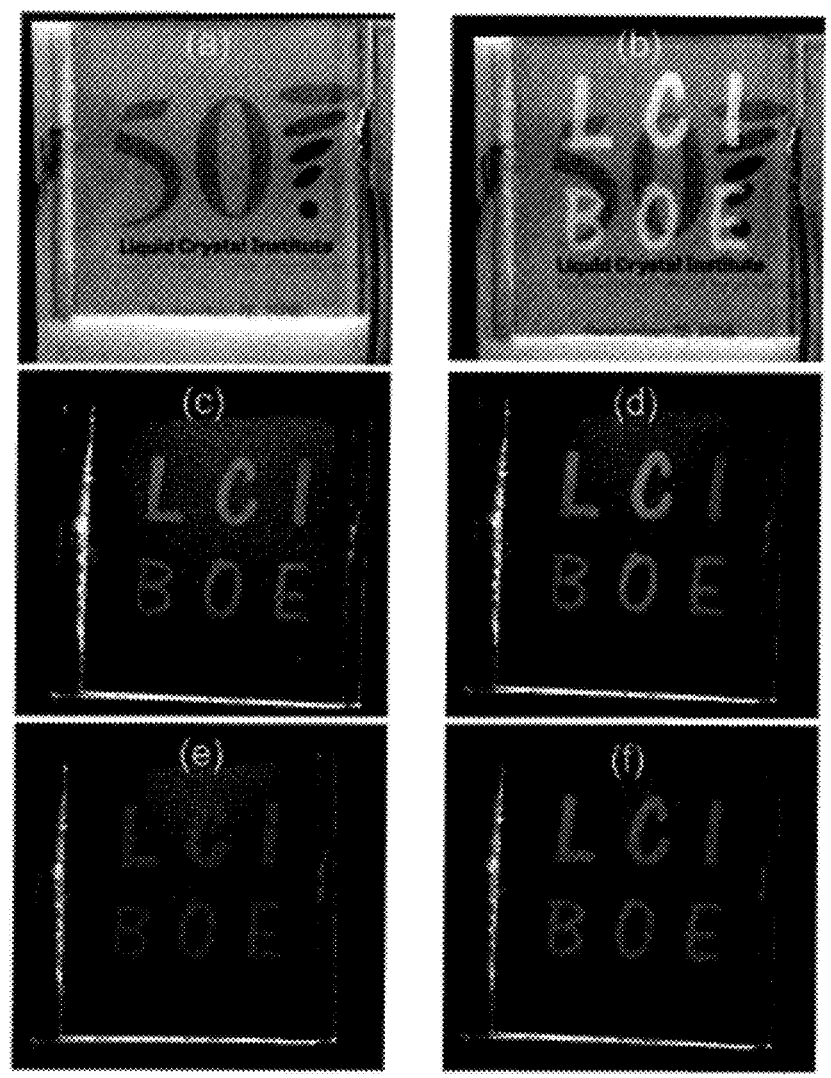
FIG. 11 includes photographs of a waveguide display in the various modes of Example 4.

The photographs of the display in a variety of modes are shown in FIG. 11. FIGS. 11a and 11b show the display in the transparent display mode. A paper with prints and pictures was placed behind the display. FIG. 11a shows the display in transparent state where no voltage was applied. The paper behind the display can be seen through the display. FIG. 11b shows the display in the display mode where 30 V was applied during all the R (red), G (green) and B (blue) sub-frames. The alphabets "LCI/BOE" in white color were displayed. FIGS. 11c-11f show the display in direct view display mode. FIG. 11c shows the display when the voltage was only applied during R sub-frame. The alphabets were display in red color. FIG. 11d shows the display when the voltage was only applied during G sub-frame. The alphabets were display in green color. FIG. 11e shows the display when the voltage was only applied during B sub-frame. The alphabets were display in blue color. FIG. 11f shows the display when the voltage was applied during R and B sub-frames. The alphabets were display in magenta color.

Example 5

A mixture consisting of 94.5 wt % liquid crystal BL038 (from Merck), 5 wt % reactive monomer RM257 (from Merck) and 0.5 wt % photo-initiator BME was prepared. The material was filled into a 10 micron thick cell. The cell was assembled with two glass substrates with indium-tin-oxide (ITO) transparent electrode. Before the assembly, the inner surface of the substrates were coated with PI2555 (from DuPont) and rubbed for homogeneous alignment of the liquid crystal. The rubbing directions of the top and bottom alignment layers were orthogonal.

Figure 12:
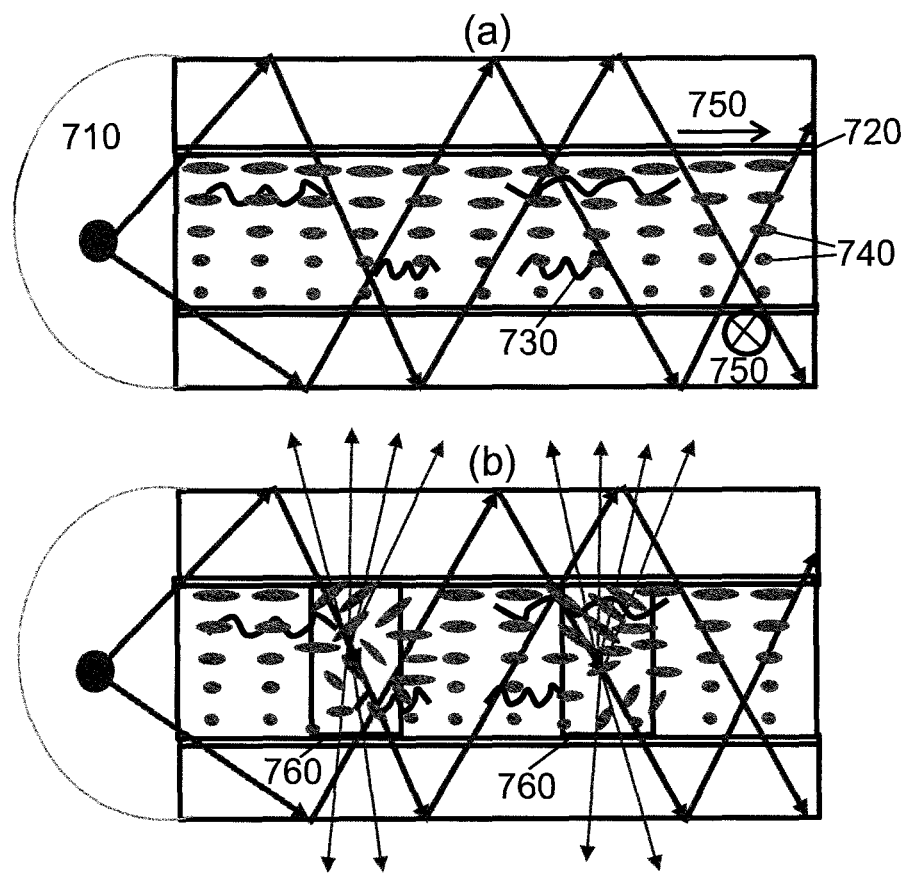
FIG. 12 is a schematic diagram of a waveguide display with a twisted structure as described in Example 5.

The liquid crystal had a twisted structure as shown in FIG. 12, wherein 710 denotes an edgelight, 720 denotes transparent electrodes, 730 denotes polymer networks, 740 denotes liquid crystals, 750 denotes the rubbing direction, and 760 denotes voltage applied pixels. The cell was irradiated by UV light to polymerize the monomer. The curing condition was that the curing time was 30 minutes and UV intensity was 8 mW/cm$^2$.

Figure 13:
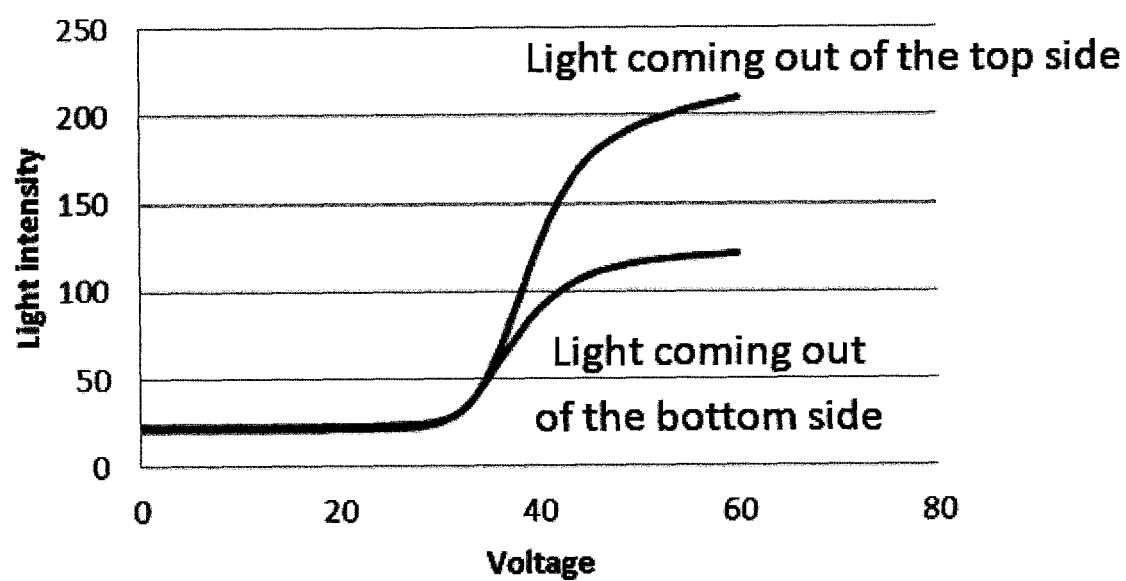
FIG. 13 is a graph showing light intensity as a function of voltage for Example 5.

A LED edge light was attached to the edge of the cell and a photo detector was placed on top of the cell in order to measure the out coming light intensity vs. voltage curve. The results are shown in FIG. 13. When there was no voltage applied across the cell, the intensity of light coming out of the cell was very low because no light was scattered. When voltages were applied across the cell, the light intensity increased. More light was scattered out of the top side of the display. Therefore this structure can increase the light intensity coming out of the viewing side of the display.

The present disclosure has been described with reference to exemplary embodiments. Obviously, modifications and alternations will occur to others upon reading and understanding the preceding detailed description. It is intended that the present disclosure be construed as including all such modifications and alterations insofar as they come within the scope of the appended claims or the equivalents thereof.

The invention claimed is:

1. A liquid crystal display comprising in sequence:
a first transparent electrode;
a first alignment layer;
a composite layer comprising a liquid crystal and a polymer; a second alignment layer; and
a second transparent electrode; and
further comprising at least one light source;
wherein when no voltage is applied the composite layer is transparent and the display acts as a waveguide plane through which incident light propagates;
wherein the liquid crystal display is a transparent liquid crystal display;
wherein when a voltage is applied the composite layer scatters incident light out of the display; and
wherein the liquid crystal display does not comprise at least one of polarizers; and color filters.

2. The liquid crystal display of claim 1, wherein the first transparent electrode and the second transparent electrode comprise indium tin oxide.

3. The liquid crystal display of claim 1, wherein the liquid crystal has a positive dielectric anisotropy.

4. The liquid crystal display of claim 1, wherein the liquid crystal has a negative dielectric anisotropy.

5. The liquid crystal display of claim 1, wherein the liquid crystal is tilted toward a cell normal direction when the voltage is applied.

6. The liquid crystal display of claim 1, wherein the liquid crystal is tilted parallel to the first transparent electrode and the second transparent electrode when the voltage is applied.

7. The liquid crystal display of claim 1, wherein the at least one light source comprises a light-emitting diode.

8. The liquid crystal display of claim 1, wherein the at least one light source comprises a red light-emitting diode, a green light-emitting diode, and a blue light-emitting diode.

9. The liquid crystal display of claim 1, wherein the first alignment layer and the second alignment layer comprise a polyimide.

10. A liquid crystal display comprising in sequence:
a first transparent substrate;
a plurality of interdigitated electrodes;
a composite layer comprising a liquid crystal and a polymer; and
a second transparent substrate; and
further comprising at least one light source;
wherein the liquid crystal display is a transparent liquid crystal display;
wherein when no voltage is applied the composite layer is transparent and the display acts as a waveguide plane through which incident light propagates;
wherein when a voltage is applied the composite layer scatters incident light out of the display;
wherein the liquid crystal display does not comprise polarizers; and wherein the liquid crystal display does not comprise color filters.

11. The liquid crystal display of claim 10, wherein the interdigitated electrodes comprise indium tin oxide.

12. The liquid crystal display of claim 10, wherein the liquid crystal has a positive dielectric anisotropy.

13. The liquid crystal display of claim 10, wherein the liquid crystal has a negative dielectric anisotropy.

14. The liquid crystal display of claim 10, wherein the liquid crystal is tilted toward a cell normal direction when the voltage is applied.

15. The liquid crystal display of claim 10, wherein the liquid crystal is tilted parallel to the first transparent substrate and the second transparent substrate when the voltage is applied.

16. The liquid crystal display of claim 10, wherein the at least one light source comprises a light-emitting diode.

17. The liquid crystal display of claim 10, wherein the at least one light source comprises a red light-emitting diode, a green light-emitting diode, and a blue light-emitting diode.

18. The liquid crystal display of claim 10, further comprising: an alignment layer between the interdigitated electrodes and the composite layer.

19. The liquid crystal display of claim 18, wherein the alignment layer comprises a polyimide.

* * * * *